(12) United States Patent
Kwak et al.

(10) Patent No.: US 7,382,265 B2
(45) Date of Patent: Jun. 3, 2008

(54) UHF RFID TAG AND METHOD OF MANUFACTURING THE SAME

(75) Inventors: Jae-hyun Kwak, Seoul (KR); Se-jin Lim, Seoul (KR); Soo-ho Kim, Suwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 269 days.

(21) Appl. No.: 11/195,029

(22) Filed: Aug. 2, 2005

(65) Prior Publication Data

US 2006/0103536 A1    May 18, 2006

(30) Foreign Application Priority Data

Nov. 12, 2004    (KR)    ................ 10-2004-0092270

(51) Int. Cl.
*G08B 13/14*    (2006.01)
(52) U.S. Cl. .................. 340/572.7; 340/572.1; 343/700 MS; 343/795
(58) Field of Classification Search ........... 340/572.1, 340/572.7, 572.8, 572.4, 10.33, 572.5, 10.34; 235/492; 156/272.2; 343/700 MS, 809, 343/795
See application file for complete search history.

(56) References Cited

U.S. PATENT DOCUMENTS

| | | | | |
|---|---|---|---|---|
| 5,851,853 A | * | 12/1998 | Lee et al. | 438/108 |
| 5,936,590 A | * | 8/1999 | Funder | 343/795 |
| 6,154,137 A | * | 11/2000 | Goff et al. | 340/572.4 |
| 6,177,872 B1 | * | 1/2001 | Kodukula et al. | 340/572.7 |
| 6,246,328 B1 | * | 6/2001 | Parkinson et al. | 340/572.1 |
| 6,580,369 B1 | * | 6/2003 | Eberhardt et al. | 340/572.1 |
| 6,946,958 B2 | * | 9/2005 | Gundlach et al. | 340/539.21 |
| 7,042,413 B2 | * | 5/2006 | Mazoki et al. | 343/795 |
| 7,098,850 B2 | * | 8/2006 | King et al. | 343/700 MS |

\* cited by examiner

*Primary Examiner*—Anh V La
(74) *Attorney, Agent, or Firm*—Drinker Biddle & Reath LLP

(57) ABSTRACT

An ultra high frequency (UHF) radio frequency identification (RFID) tag and a method of manufacturing the tag are provided. The tag includes a substrate, a chip attached to the substrate and having a plurality of bumps for connecting a circuit formed therein with an external, and at least one UHF antenna extended in a longitudinal direction and responding to ultra high frequency transferred from the external, at least one end of the UHF antenna connected to the bump, and one portion of the antenna fixed to the substrate. Also, the method includes a) process of fixing a chip having a plurality of bumps to an upper surface of a substrate, b) process of installing a cutter between the bumps such that a blade portion of the cutter is placed at a certain height from the substrate, and c) process of installing a UHF antenna by lowering the UHF antenna having an extended portion to the cutter, with the antenna being positioned in a direction perpendicular to the blade portion, cutting the extended portion of the antenna by the cutter, and continuously lowering the antenna until a cut end of the antenna is connected to the bump. Since the UHF RFID tag employs a plurality of short UHF antennas instead of a loop-type antenna, the tag is integrated as much as it is required, due to a small volume, and a process of bonding the antenna to a chip is rapidly and easily performed.

18 Claims, 4 Drawing Sheets

(A)

(B)

UHF RFID TAG AND METHOD OF MANUFACTURING THE SAME

CROSS-REFERENCE TO RELATED PATENT APPLICATIONS

This application claims the benefit of Korean Patent Application No. 10-2004-0092270, filed on Nov. 12, 2004, in the Korean Intellectual Property Office, the disclosure of which is incorporated herein in its entirety by reference.

BACKGROUND OF THE INVENTION

1. Field of the Invention

The present invention relates to an ultra high frequency (UHF) radio frequency identification (RFID) tag and a method of manufacturing the same.

2. Description of the Related Art

An RFID tag includes circuitry (e.g., a microchip) for storing various data and an antenna that is connected to the circuitry for inputting the data or transmitting the stored data to a reader. The RFID tag is used with the reader that receives a signal transmitted from the antenna (i.e., backscatter) and sends the signal to a dedicated computer to enable an operator to obtain and analyze the RFID tag's data.

Various data stored on the RFID tag is read via wireless communication between the RFID tag and the reader in a process known in the art as "interrogation." The RFID tag is attached to individual items, such as products, cargos, materials, marketable securities, animals and plants, to improve efficiencies of production, distribution and marketing.

FIG. 1 is a schematic view depicting a construction of a conventional RFID tag 11.

In RFID tags, the structure and shape of the antenna are varied depending upon a used frequency band or maximum wireless identification (i.e., read) range to be required.

FIG. 1 shows an example RFID tag 11 that operates in the high frequency (HF) range of about 13.56 MHz. The RFID tag 11 includes a rectangular substrate 13, a conductive film 21 that is secured to a center of the substrate 13, a chip 19 that is mounted onto an upper surface of the conductive film 21 and electrically connected to the conductive film 21, and a loop antenna 15 surrounding the chip 19 and having both ends connected to the chip 19 via the conductive film 21. One end of the loop antenna 15 is directly connected to the conductive film 21, and the other end is indirectly connected to the conductive film 21 via a connection 17.

The antenna 15 and the chip 19 compose a closed circuit that operates in response to an external frequency (e.g., an electromagnetic field).

Since the antenna 15 occupies a significant area on the surface of the substrate 13 of the conventional RFID tag 11, the entire area of the tag 11 cannot be narrowed, which limits potential applications of the tag 11. Moreover, the illustrated antenna 15 may easily become damaged or scratched resulting in a short or open circuit. Of course, if any one portion of the antenna 15 is damaged, the tag 11 is rendered useless.

For a conventional RFID tag operating at ultra high frequency (UHF), the UHF RFID tag is previously prepared and is then attached to a target portion of the object through a separate process. In this case, the RFID tag may become damaged in the process of preparing the RFID tag (e.g., peeling off a backing from an adhesive layer) or attaching the RFID tag to the object.

Also, the foregoing conventional UHF RFID tag, which has a lead frame-type (i.e., printed circuit-type) antenna, is made by a process of coating a lower end of the lead frame antenna with an additional insulation thin film, attaching and molding the antenna to a chip. Therefore, the manufacturing process is complicated.

SUMMARY OF THE INVENTION

The present invention provides an ultra high frequency (UHF) radio frequency identification (RFID) tag and method of manufacturing the same. The provided UHF RFID tag employs a plurality of short UHF antennas instead of a loop-type antenna so that the tag has a reduced size. A process of bonding the UHF antennas to a chip may be rapidly and easily performed.

According to an aspect of the present invention, there is provided an ultra high frequency (UHF) radio frequency identification (RFID) tag comprising: a substrate; a chip attached to the substrate and having a plurality of bumps for connecting a circuit that is within the chip to an external circuit; and at least one UHF antenna extended in a longitudinal direction and responding to an ultra high frequency electromagnetic field, wherein at least one end of the UHF antenna is connected to the bump and one portion of the antenna is fixed to the substrate.

The UHF antenna may be adhered to the bump by a conductive paste.

The UHF antenna extends in a longitudinal direction above the substrate and has one end fixed to the bump and the other end bent downward to contact the substrate.

In some embodiments, the substrate may be a target object to which the chip and UHF antenna are fixed.

According to another aspect of the present invention, there is provided a method of manufacturing a UHF RFID tag comprising: a) fixing a chip having a plurality of bumps to a surface of a substrate; b) installing a cutter between the bumps such that a blade portion of the cutter is placed at a certain height from the substrate; and c) installing a UHF antenna by lowering the UHF antenna having an extended portion to the cutter, with the antenna being positioned in a direction perpendicular to the blade portion, cutting the extended portion of the antenna by the cutter, and continuously lowering the antenna until a cut end of the antenna is connected to the bump.

The method may further comprise: installing a compressible tube which is compressed by the cutter when the cutter is pressed down to cut the UHF antenna, the compressible tube positioned adjacent to the bump between the cutter and the chip and having a through hole facing the bump; and filling a conductive material in an interior of the compressible tube.

The cutter may have a blade portion provided on an upper end thereof for cutting the UHF antenna, and inclined portions, oppositely inclined downward from a center of the blade portion and having a lower end positioned adjacent to the bump, for guiding a cut end of the UHF antenna to an upper portion of the bump.

The process of installing the UHF antenna may comprise stage of lowering the UHF antenna downward to the blade portion of the cutter until the antenna reaches the blade portion; stage of pressing, cutting and squeezing the compressible tube with the UHF antenna which depresses down the blade portion of the cutter, to discharge the conductive material from the compressible tube and simultaneously cut the UHF antenna; and stage of bonding the UHF antenna by continuously lowering the UHF antenna cut by the cutter along the inclined portion until the cut end of the UHF antenna reaches the conductive material staying on the upper portion of the bump.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification.

Figure 1:
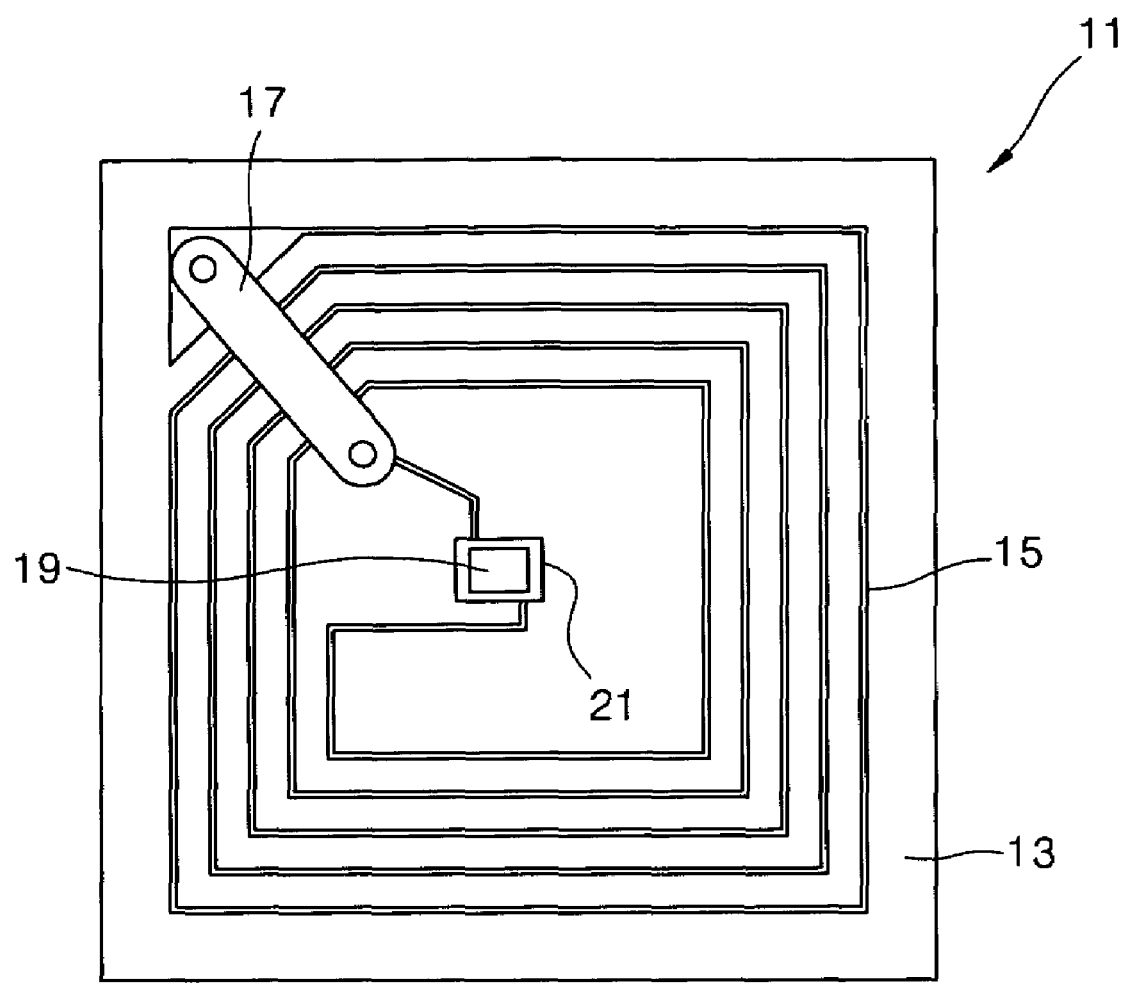
FIG. 1 is a plan view illustrating a conventional radio frequency identification (RFID) tag.
Figure 2:
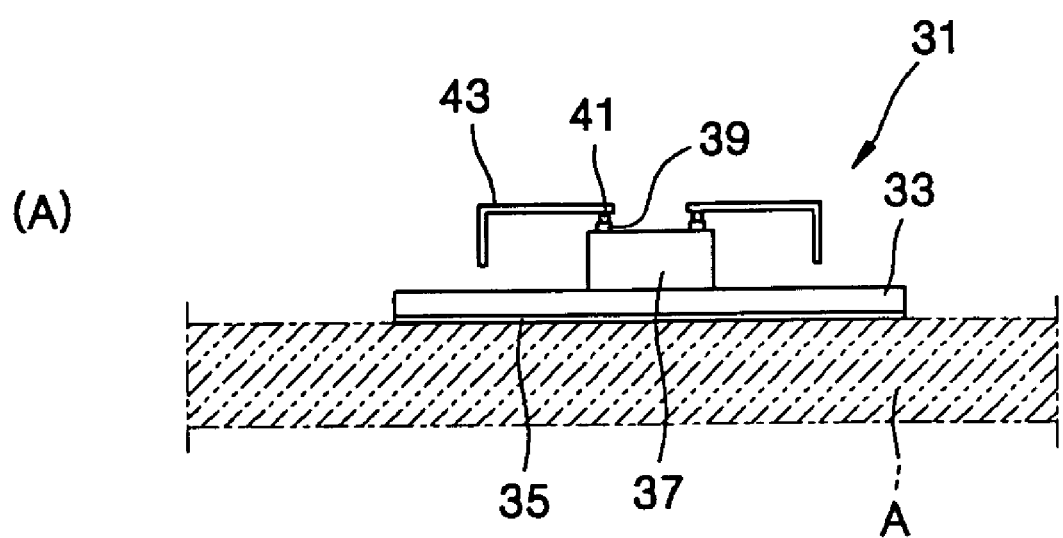
FIGS. 2A and 2B are elevation views illustrating two embodiments of an ultra high frequency (UHF) RFID tag according to an aspect of the present invention.
Figure 2:
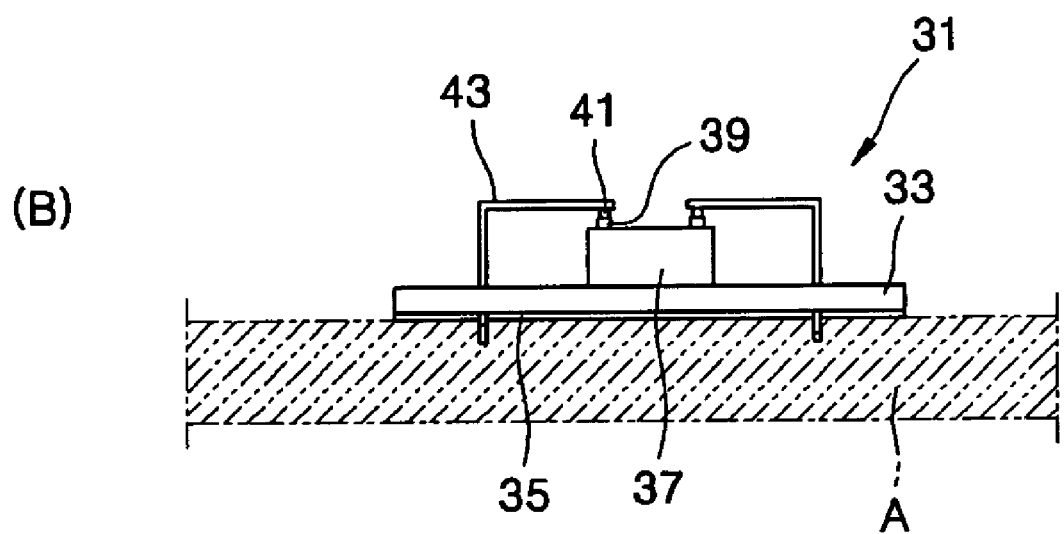

FIGS. 2A and 2B are elevation views depicting two embodiments of an ultra high frequency (UHF) radio frequency identification (RFID) tag 31 according to one aspect of the present invention.

Referring to FIG. 2A, the UHF RFID tag 31 includes a non-conductive substrate 33 of a certain thickness, a chip 37 being secured to a center of the substrate 33 and having a plurality of connecting bumps 39 (e.g., contacts, pads, pins, etc.) on an upper surface and a plurality of UHF antennas 43 connected to the chip 37 via the bumps 39.

The UHF antenna 43 is adhered onto the bump 39 with a conductive material 41 at a proximal end of the antenna 43 and horizontally extends away from the chip 37 above and generally parallel to the substrate 33. A distal end of the antenna 43 is bent towards the substrate so that the antenna 43 is generally L-shaped. The UHF antenna 43 drives the tag 31 in response to an adjacent ultra high frequency electromagnetic field.

The conductive material 41 may be a known conductive paste, for example, silver (Ag) or other metal such as solder. To affix the proximal end of each UHF antenna 43 to each bump 39, molten silver is introduced between the bump 39 and the UHF antenna 43. The molten silver is then cooled to fix the UHF antenna 43 to the bump 39 as a solder ball.

In another embodiment, the distal end of the UHF antenna 43 can be extended downwardly towards the substrate 33 so that the distal end is fixed to the substrate 33. In this embodiment, both of the proximal end and distal end of the UHF antenna 43 are supported to provide additional stability against external impact.

An adhesive layer 35 is applied a bottom surface of the substrate 33 to fix the substrate 33 to a target object A. For example, the adhesive layer 35 may be a glue or double-sided tape.

In yet other embodiments, the tag 31 may include the chip 37 with the UHF antenna 43 mounted thereto, but without the substrate 33. In this case, the chip 37 is directly fixed to the target object A.

In order to directly fix the chip 37 to the target object A, the chip 37 is firstly fixed to a desired position of the object A, and then, the antenna 43 is adhered to the fixed chip 37. Thus, as can be appreciated, the chip 37 is fixed to a product as a process of manufacturing the product and the antenna 43 is affixed later in another process.

The target object A may be any type of dispensable product, for example, agricultural or industrial raw materials, clothing, manufactured goods, and PCBs. The target object A also may be packaging materials (e.g., resin, paper) in which a product is disposed.

Referring to FIG. 2B, the distal end of the UHF antenna 43 extends through the substrate 33 and partially into the target object A such that the UHF antenna 43 is stably maintained at its distal end.

Further, the portion of the distal end of antenna 43 that is protruded downward from the substrate and into the target object A facilitates engagement of the RFID tag 31 to the target object A. In this case, it will be appreciated that the target object A is of a relatively softer physical property (e.g., styrofoam, paper, cardboard, fiber, etc.) than the UHF antenna 43. Moreover, the tag 31 may be more firmly fixed to the target object A by bending the downwardly protruded portion of the distal end of antenna 43 in any direction to form an interference fit with the object A. Alternatively, the distal end of antenna 43 may include a barb or the like to prevent disengagement from the object A.

FIGS. 3A through 3F are views illustrating steps of a method for manufacturing a UHF RFID tag according to one aspect of the present invention. FIG. 4 is a flowchart describing the steps corresponding to FIGS. 3A through 3F for a method of manufacturing a UHF RFID tag.

Figure 3:
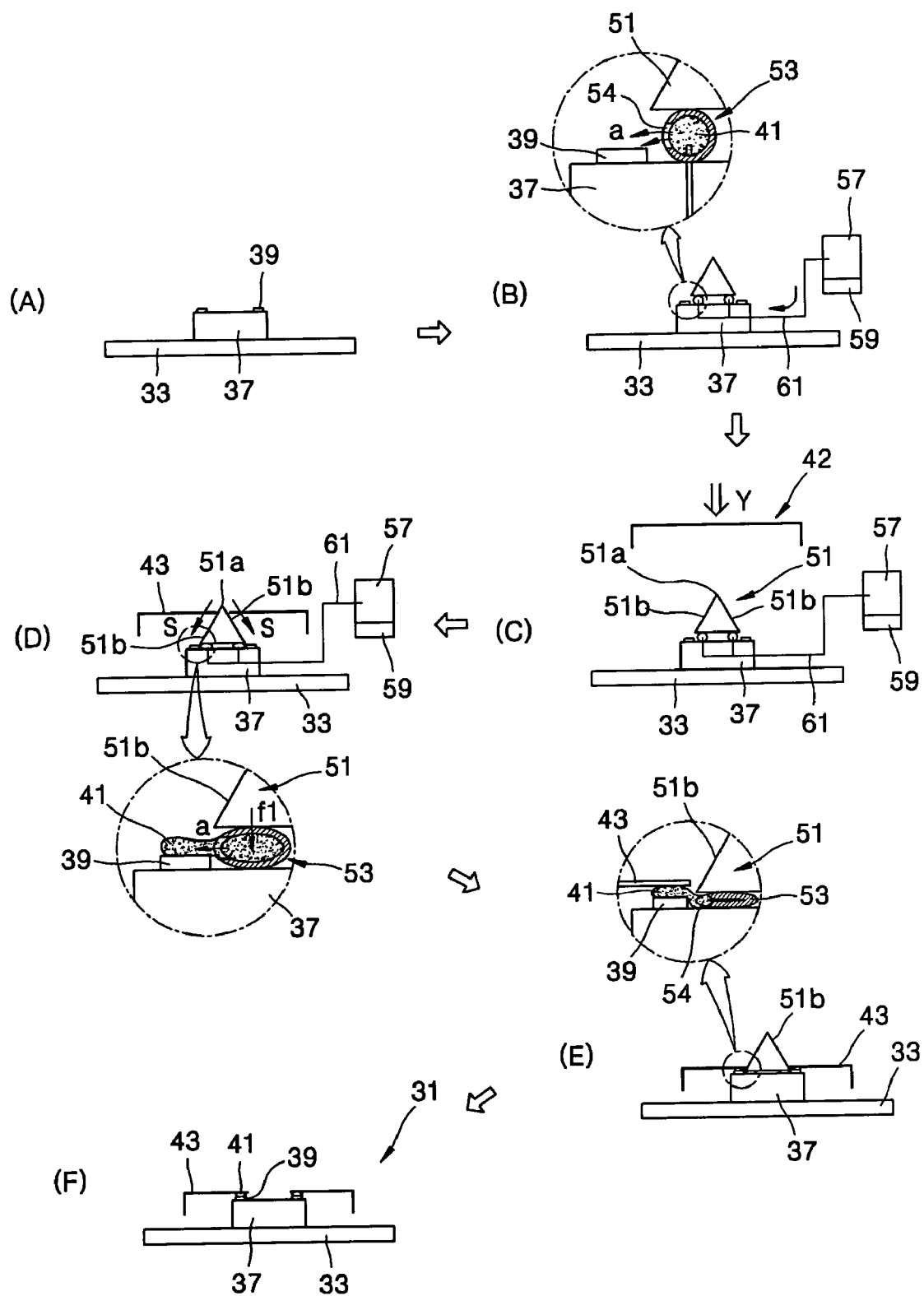
FIGS. 3A through 3F are views depicting a method of manufacturing a UHF RFID tag according to one embodiment of the present invention.
Figure 4:
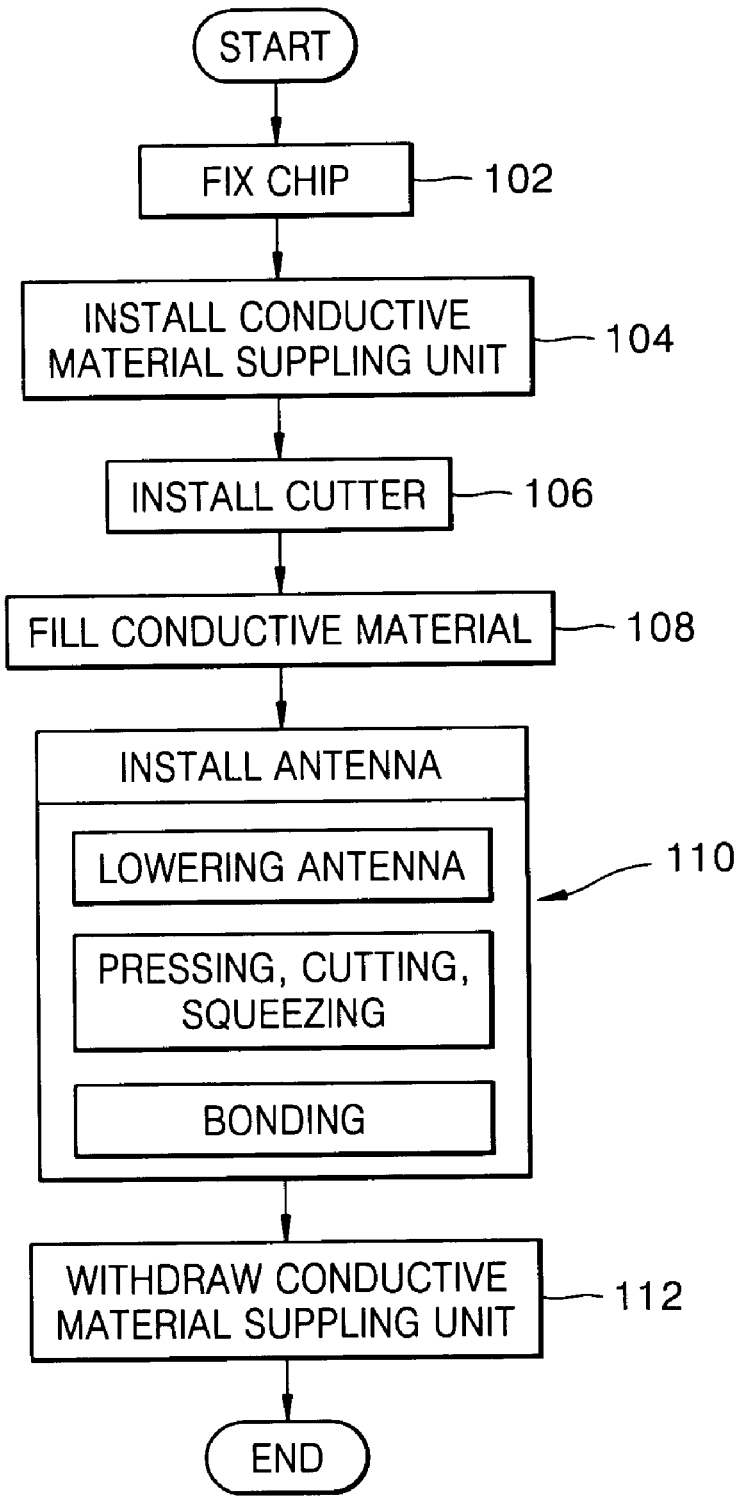
FIG. 4 is a flowchart depicting a method of manufacturing a UHF RFID tag according to one embodiment of the present invention.

Referring to FIGS. 3A-3F and 4, a method of manufacturing the tag according to the present invention starts with a process of fixing the chip 37 at a desired position on the substrate 33 (FIG. 3A and FIG. 4, step 102). In the case where the substrate 33 is not employed, the chip fixing process (102) is performed by merely fixing the chip 37 to the target position on the target object A.

After the chip fixing process (102), a process of installing a conductive material supplying unit is performed (104). In the process of installing the conductive material supplying unit, a pair of hollow compressible tubes 53 (FIG. 3B) of a certain length (i.e., extending into the page) are arranged in parallel on the upper portion of the chip 37, and the compressible tube 53 is connected to a storage tank 57 for storing the conductive material 41. A supply pipe 61 interconnects the tank 57 with the tubes 53 to deliver the conductive material 41.

The compressible tube 53 is made of a synthetic resin or like material that is compressible by an external force. Each tube 53 is positioned adjacent to each bump 39. As shown in this embodiment, if the bumps 39 are arranged in two rows, two compressible tubes 53 are provided. As shown in FIGS. 3B and 3D, the compressible tube 53 is formed with a through hole 54 in the wall of the tube 53. Each of the compressible tubes 53 is configured so that its through hole is facing the adjacent bump 39. As can be appreciated in FIG. 3D, the through hole 54 discharges the conductive material 41 that is filled in the compressible tube 53 in a direction indicated by an arrow "a" when the compressible tube 53 is compressed.

The storage tank 57 is used to store the conductive material 41 and has a heater 59, for example, at a lower portion thereof. The heater 59 heats the conductive material 41 to induce the conductive material 41 to have sufficient fluidity. For example, if silver is utilized as the conductive material 41, the silver is made molten and viscous by the heater 59, which maintains the silver in its molten state. Accordingly, the heater 59 may not be employed depending upon the kind of conductive material 41 that is selected.

The supply pipe 61 communicates the conductive material 41 stored in the storage tank 57 into the compressible tube 53. If necessary, an intermediate valve (not shown) may be installed to the supply pipe 61.

After the process of installing the conductive material supplying unit (104), a process of installing a cutter is performed (106). In the process of installing the cutter (106), a cutter 51 is configured above the compressible tube 53 (see FIG. 3B).

The cutter 51 is formed in the shape of a triangular prism having a blade portion 51a and inclined portions 51b depending from the blade portion 51a. The blade portion 51a is provided on an upper edge of the cutter 51 to cut an antenna member 42 into two parts that form the UHF antennas 43. As shown in FIG. 3C, the antenna member 42 is lowered onto the cutter 51 in a direction indicated by an arrow "Y". Each of the inclined portions 51b is inclined downward from the blade portion 51a to guide a UHF antenna 43 that is cut from the antenna member 42 in a direction indicated by an arrow S in FIG. 3D.

After the cutter 51 is installed to the upper portion of the compressible tube 53, a process of filling the conductive material is performed (108).

In the process of filling the conductive material (108), the conductive material 41 stored in the storage tank 57 is supplied to the compressible tube 53 via the supply pipe 61.

Now, when the conductive material 41 is filled in the compressible tube 53 and the cutter 51 is installed to the upper portion of the compressible tube 53, an antenna installing process (110) is ready.

It would be seen from FIG. 3C, the inverted, square U-shaped antenna member 42 is lowered in a direction indicated by arrow "Y" to be bisected, thereby forming the antennas 43. The antenna member 42 is extended in a direction perpendicular to an extended direction (i.e., into the page) of the blade portion 51a, and both ends of the antenna member 42 are bent downward.

When the antenna member 42 is continuously lowered in the direction indicated by the arrow "Y" to reach the blade portion 51a, the center of the antenna member 42 is cut by the blade portion 51a to form the UHF antennas 43. After being cut from the antenna member 42, the UHF antennas 43 continue to be lowered in the direction indicated by the arrows "S", as shown in FIG. 3D.

As further shown in FIG. 3D, particularly in the detail view, as the cutter 51 is contacted by the antenna member 42, the compressible tube 53, which is positioned under the cutter 51, is compressed in a direction indicated by an arrow f1. As such, the conductive material 41 in the compressible tube 53 is discharged onto the upper portion of the bump 39 via the through hole 54 in the direction indicated by the arrow "a". At this time, the conductive material 41 is maintained in a viscous state.

As shown in FIG. 3E, the cut UHF antennas 43 are further lowered until the cut end (i.e., proximal end) of each UHF antenna 43 comes to rest on the conductive material 41 and becomes adhered thereto. At this time, if desired, the distal end of each UHF antenna 43 may be bent or otherwise extended into the substrate 33 as shown in FIG. 2B.

However, if the distal end of each UHF antenna 43 is not extended into the substrate 33, the UHF antenna 43 should be horizontally maintained until the conductive material 41 is fully cured.

After the conductive material 41 has fully cured to complete the fixation of the UHF antenna 43, the compressible tube 53 and the cutter 51 are withdrawn from the tag 31 through a process of withdrawing the conductive material supplying unit (112).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing an ultra high frequency RFID tag, the method comprising:
    a) fixing a chip having plural contacts to an upper surface of a target object;
    b) disposing a cutter above the chip to a blade portion is oriented upward;
    c) lowering a UHF antenna member onto the blade portion;
    d) cutting the UHF antenna member into two mirror-image UHF antennas; and
    e) affixing a first end of each of the two mirror-image UHF antennas to each of the plural contacts.

2. The method of claim 1 further comprising the step of affixing a second end of each of the two mirror-image UHF antennas to the target object.

3. The method of claim 1 further comprising the step of disposing a conductive paste on the each of the plural contacts.

4. The method of claim 1 further comprising the steps of:
    disposing a compressible tube proximate each of the plural contacts and under the base of the cutter, wherein the cutter has a generally triangular prism-shape and a base of the cutter is oriented between the plural contacts and above the chip;
    configuring each compressible tube so that a discharge hole therethrough is oriented toward a proximate contact; and
    filling the compressible tubes with a conductive material.

5. The method of claim 4 wherein the lowering step further comprises the step of moving the cutter downward to compress each compressible tube so that the conductive material is ejected through the discharge holes onto the plural contacts.

6. The method of claim 4 wherein the filling step further comprises the steps of:
    providing a storage tank;
    disposing a conductive material in the storage tank;
    connecting the storage tank to the compressible tubes with a supply pipe; and
    pumping the conductive material into the compressible tubes.

7. The method of claim 6 wherein the affixing step further comprises:
    maintaining each of the two mirror-image UHF antennas in a fixed position;
    curing the conductive material; and
    removing the compressible tubes.

8. An ultra high frequency RFID tag made by the process of:
provicing a nonconductive substrate;
affixing to the nonconductive substrate a microchip having first and second contacts thereon;
disposing a compressible tube on the microchip proximate each of the first and second contacts;
configuring each compressible tube so that a discharge hole is oriented toward a proximate contact;
filling the compressible tubes with a conductive material;
disposing a generally triangular prism-shaped cutter above the microchip so that a blade portion is oriented upward and a base of the cutter is oriented between the first and second contacts and above the compressible tubes;
providing an inverse, square U-shaped antenna member;
orienting the inverse, square U-shaped antenna member above the cutter for bisection by the cutter;
lowering the square U-shaped antenna member onto the blade portion;
cutting the UHF antenna member into two mirror-image UHF antennas; and
affixing a first end of each of the two mirror-image UHF antennas to one of the first and second contacts.

9. The ultra high frequency RFID tag of claim 8 wherein the cutting step further comprises the step of moving the cutter downward to compress each compressible tube so that the conductive material is ejected through the discharge holes onto the contacts.

10. The ultra high frequency RFID tag of claim 8 wherein the microchip is configured to receive a supply pipe to deliver the conductive material from a storage tank to the compressible tubes.

11. The ultra high frequency RFID tag of claim 8 further comprising the step of affixing a second end of each of the two mirror-image UHF antennas to the substrate.

12. The ultra high frequency RFID tag of claim 11 wherein each of the second ends extends through the substrate to engage a target object thereunder.

13. The ultra high frequency RFID tag of claim 8 further comprising the steps of:
maintaining each of the two mirror-image UHF antennas in a fixed position;
curing the conductive material; and
removing the compressible tubes.

14. A method of manufacturing an ultra high frequency RFID tag, the method comprising:
configuring a chip on a surface of a target object, the chip including at least two spaced-apart contacts;
configuring a compressible tube proximate each of the at least two spaced-apart contacts, each of the compressible tubes including conductive material therein and discharge holes oriented to eject the conductive material toward proximate contacts;
providing a cutter configured to contact each of the compressible tubes;
using the cutter to cut a UHF antenna member into two UHF antennas, the two UHF antennas being substantially mirror-images of each other;
moving the cutter downward to compress each compressible tube so that the conductive material is ejected through the discharge holes onto the at least two spaced-apart contacts; and
connecting a cut end of each of the two UHF antennas to each of the at least two spaced-apart contacts.

15. The method of claim 14 further comprising the step of connecting second ends of the two UHF antennas to the target object.

16. The method of claim 14 further comprising the step of disposing a conductive paste on the each of the at least two spaced-apart contacts.

17. The method of claim 14 further comprising the steps of:
providing a storage tank;
disposing a conductive material in the storage tank;
connecting the storage tank to the compressible tubes with a supply pipe; and
pumping the conductive material into the compressible tubes.

18. The method of claim 17 further comprising:
maintaining each of the two UHF antennas in a fixed position;
curing the conductive material; and
removing the compressible tubes.

* * * * *